INVENTOR
S. Y. TONG
BY R C Lipton
ATTORNEY

FIG. 5

| INFORMATION BLOCKS TO BE TRANSMITTED | PARITY BITS GENERATED FOR THE INFORMATION BLOCKS |
|---|---|
| $I_0$ = 0 0 0 0 1 | $P_0$ = 0 0 1 1 1 |
| $I_1$ = 0 1 0 1 0 | $P_1$ = 0 0 0 1 1 |
| $I_2$ = 1 1 1 0 1 | $P_2$ = 0 1 1 0 0 |
| $I_3$ = 1 0 0 0 0 | $P_3$ = 1 1 0 1 0 |

| CODE BLOCKS (INFORMATION BLOCKS PLUS PARITY BITS) | TRANSMITTED DATA BLOCKS (CODE BLOCKS & PREVIOUSLY TRANSMITTED INFORMATION BLOCKS) |
|---|---|
| $C_0$ = 0 0 1 1 1 0 0 0 0 1 | $M_0$ = 0 0 1 1 1 0 0 0 0 1 = $C_0$ + — |
| $C_1$ = 0 0 0 1 1 0 1 0 1 0 | $M_1$ = 0 0 0 1 1 0 1 0 1 0 = $C_1$ + — |
| $C_2$ = 0 1 1 0 0 1 1 1 0 1 | $M_2$ = 0 1 1 0 1 1 1 1 0 1 = $C_2$ + $I_0$ |
| $C_3$ = 1 1 0 1 0 1 0 0 0 0 | $M_3$ = 1 0 0 0 0 1 0 0 0 0 = $C_3$ + $I_1$ |

FIG. 6

| RECEIVED DATA BLOCKS (POSITION IN ERROR SHOWN IN BOXES) |
|---|
| $M_0^*$ = [1] 0 [0] 1 [0] [1] [1] 0 [1] [0] |
| $M_1^*$ = 0 0 0 1 1 0 1 0 1 [1] |
| $M_2^*$ = 0 1 1 0 1 1 1 1 0 1 |
| $M_3^*$ = 1 0 0 0 0 [0] 0 0 0 0 |

FIG. 7

| SYNDROMES WHICH INDICATE A CORRECTABLE ERROR | POSITION OF THE ERROR INDICATED BY THE SYNDROME |
|---|---|
| 0 0 1 1 1 | 1 |
| 0 1 1 1 0 | 2 |
| 1 1 1 0 0 | 3 |
| 0 1 1 0 1 | 4 |
| 1 1 0 1 0 | 5 |
| 0 0 0 0 1 | 6 |
| 0 0 0 1 0 | 7 |
| 0 0 1 0 0 | 8 |
| 0 1 0 0 0 | 9 |
| 1 0 0 0 0 | 10 |

United States Patent Office 3,544,963

Patented Dec. 1, 1970

3,544,963

RANDOM AND BURST ERROR-CORRECTING ARRANGEMENT

Shih Y. Tong, Middletown, N.J., assignor to Bell Telephone Laboratories, Incorporated, Murray Hill, N.J., a corporation of New York Filed Dec. 27, 1968, Ser. No. 787,496
Int. Cl. G08c *25/00;* H04l *1/10*
U.S. Cl. 340—146.1 18 Claims

ABSTRACT OF THE DISCLOSURE

A system is disclosed for utilizing block codes to correct both random and burst errors. Information sequences are encoded into a block code capable of correcting a certain number of random errors. Portions of previously encoded information sequences or sequences derived therefrom are added to each code word and the resultant sequence is transmitted to a receiving station. At the receiving station, each received sequence is decoded to determine if the number of errors are within the error-correcting ability of the code. If so, the sequence is corrected using a random error-correcting technique. If not, the information portion of the sequence is replaced with information derived from previously and/or subsequently received sequences.

BACKGROUND OF THE INVENTION

Field of the invention

This invention relates to data transmission and processing systems and more particularly to error detection and correction in such systems.

Description of the prior art

The need for accurate transmission and processing of digital data is well recognized in such areas as telegraphy, telephony, and computer and automation technology. A variety of methods have been developed for improving the accuracy of transmission. Such methods range from simple single-bit error detecting schemes requiring the appending of a single bit to each data character or word to be transmitted to more elaborate schemes of error correction requiring the numerous interspersing of parity check bits among the information bits.

Arrangements have been developed to correct random errors (errors occurring randomly throughout the transmitted data), burst errors (errors occurring in "bunches"), or both random and burst errors. Since telephone transmission lines are subject to both random and burst errors, considerable interest has centered on finding efficient arrangements for correcting both types of errors. Prior arrangements for correcting either burst errors or both random and burst errors have required a large data storage capacity. This is because such arrangements generally require a rather large guard space of error-free digits between the error bursts in order to correct the erroneous digits. Therefore, a large amount of received data normally must be stored prior to decoding. Heretofore, all arrangements for correcting either burst errors or both burst and random errors required storage of at least that number of digits equal to the guard space requirement of the arrangement.

SUMMARY OF THE INVENTION

In view of the above described prior art arrangements, it is an object of the present invention to provide for correcting both random and burst errors in a data transmission system.

It is another object of the invention to provide a random and burst error-correcting system having a small receiving terminal storage requirement.

Still another object of the present invention is to provide a system wherein the receiving terminal digital storage requirement is smaller than the digital guard space requirement.

These and other objects of the present invention are realized in a specific illustrative system embodiment which includes a transmitting and receiving terminal connected by a noisy communication channel. The transmitting terminal includes an encoder which is arranged to encode blocks of information characters from an information source into code words of an $(n, k)$ block code having a certain random error-correcting capability where, in general, $k/n \leq (b-1)/b$, and in particular for the specific illustrative embodiment, $k/n=(b-1)/b$ and $b$ is an integer. (It should be noted that less than the full random error-correcting capability of the code may be used thereby increasing the random error-detecting capability. The choice is in the user.) Portions of every $l$th information block of the $(b-1)l$ previously encoded blocks or information derived therefrom are then added to the code words, where $l$ is any integer. The sequences obtained from this addition are then transmitted via the communication channel to the receiving terminal.

Each received sequence is decoded to determine if the number of errors in the sequence is within the random error-correcting capability chosen for the code. If so, the errors are corrected (if there are any), in any conventional error-correcting manner and the corrected blocks of information characters stored. If the number of errors in the received sequence is greater than the random error-correcting capability of the code (i.e., a burst error), then previously and/or subsequently transmitted error-free blocks are utilized to derive an information block to replace the erroneous block. The corrected information blocks are then applied to a data utilization circuit.

The guard space requirement with the above arrangement is $(b-1)nl$ characters and the storage requirement at the receiving station is $[(b-1)^2/b]nl+n$ characters. Thus it is seen that the storage requirement is even less than the guard space requirement.

BRIEF DESCRIPTION OF THE DRAWINGS

A complete understanding of the present invention and of the above and other objects and advantages thereof, may be gained from a consideration of the following detailed description of specific illustrative embodiments presented hereinbelow in connection with the accompanying drawings, in which:

FIG. 5 shows the syndromes which indicate correctable errors for the code used by the system of FIGS. 3 and 4;

FIGS. 6 and 7 show representations of exemplary encoded and transmitted data blocks for the system of FIGS. 3 and 4.

DETAILED DESCRIPTION

Figure 1:
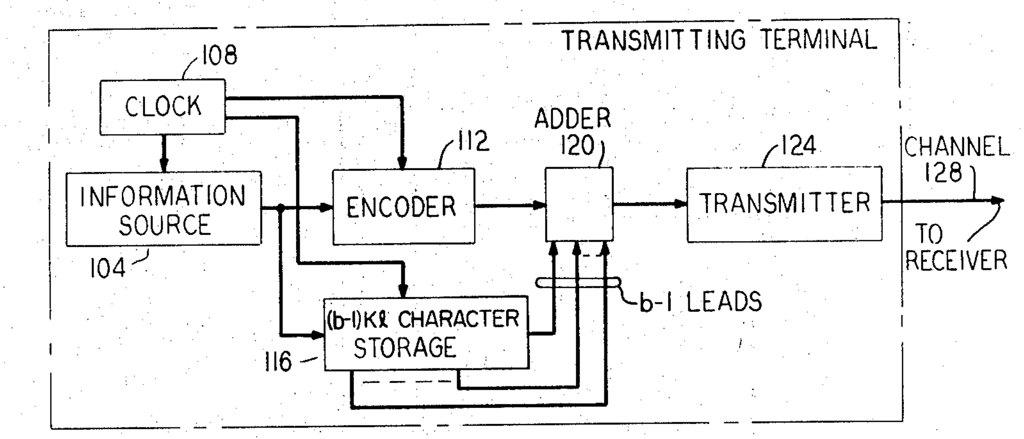
FIGS. 1 and 2 show a generalized illustrative random and burst error-correcting system made in accordance with the principles of the present invention.

Before discussing the drawings in detail, it will be helpful to briefly discuss the algebraic representation of codes and coding processes. In general, a $k$-character information sequence may be represented by a polynomial of the form, $$A(X)=a_0+a_1x+ \ldots +a_{k-1}x^{k-1}$$

In the binary case, the coefficients $a_0, a_1, \ldots a_{k-1}$ represents either a "0" or "1." For example, the binary sequence 101101 may be represented by the polynomial $1+x^2+x^3+x^5$. With such representation, the information bits corresponding to the high-order coefficients are thought of as being transmitted first.

An $(n, k)$ cyclic code may be defined in terms of a generator polynomial $G(x)$ of degree $n-k$. The $k$-character data word is encoded by dividing the data word having $n-k$ "0's" appended to it [represented by $x^{n-k}A(x)$] by the generator polynomial $G(x)$. The remainder $R(x)$ obtained from this division represents the parity sequence or parity characters which are then to be added to the data word $x^{n-1}A(x)$.

The encoded information can thus be represented by $$C(x)=x^{n-k}A(x)+R(x)$$

Encoding methods and code representations are discussed in detail in "Error Correcting Codes" by W. W. Peterson, the M.I.T. Press and John Wiley & Sons, 1961.

An illustrative algebraic description of the present invention will now be given using the representations discussed above. As indicated above, blocks or sequences of information characters are encoded into an $(n, k)$ block code having a certain random error-correcting ability where $k/n=(b-1)/b$ and $b$ is an integer. $I_j(x)$ will be used to represent the $j$th block of information characters. Assume now that the information block $I_{(b-1)l}(x)$ is to be encoded, the previous block $I_0(x), \ldots, I_{(b-2)l}(x)$ having been encoded. This is done as indicated above, by dividing $x^{n-k}I_{(b-1)l}(x)$ by the generator polynomial of the code $G(x)$ to obtain a remainder $$R[\{x^{n-k}I_{(b-1)l}(x)\}/G(x)]$$

The encoded word is thus $$C_{(b-1)l}(x)=x^{n-k}I_{(b-1)l}(x)+R[\{x^{n-k}I_{(b-1)l}(x)\}/G(x)]$$

Portions of every $l$th one of the previously encoded $(b-1)l$ information blocks are then added to $C_{(b-1)l}(x)$ to obtain $$M_{(b-1)}(x)=C_{(b-1)l}(x)+I^2_{(b-2)l}(x)+I^2_{(b-3)l}(x)+\ldots+I_0^{b-1}(x)$$

where $I_j^i(x)$ represents the $i$th group of $k/(b-1)$ bits of the information block $I_j(x)$. The block $M_{(b-1)l}(x)$ is then transmitted via a communication channel to a receiving station. The received block is represented as $$M^*_{(b-1)l}(x)$$

indicating that it may contain errors.

At the receiving terminal, the block $M^*_{(b-1)l}(x)$ is received and registered. The previously transmitted $(b-1)l$ blocks were also received, stored, and processed to determine if the number of errors in the blocks exceeded the random error-correcting capability of the code. If a block were found to contain more errors than the error-correcting capability of the code, then an indication was stored in a tracer storage unit that the block was incorrect. Alternatively, if a block were found to contain no more errors than the error-correcting capability of the code, then the block was corrected an an indication stored that the block was correct.

If upon receipt of the block $M^*_{(b-1)l}(x)$ the tracer unit indicates that every $l$th one of the previously received information blocks—$I_{(b-2)l}(x), I_{(b-3)l}(x), \ldots, I_0(x)$—are correct, then portions of these blocks, $$I^1_{(b-2)l}(x)+I^2_{(b-3)l}(x)+\ldots+I_0^{b-1}(x)$$

are subtracted from $M^*_{(b-1)l}(x)$ to obtain $C_{(b-1)l}(x)$. $C_{(b-1)l}(x)$ is then decoded in the conventional manner. If the number of errors in $C_{(b-1)l}(x)$ does not exceed the rando merror-correcting capability of the code, then $C_{(b-1)l}(x)$ is corrected and the information portion of $C_{(b-1)l}(x)$, i.e., $I_{(b-1)l}(x)$, is stored at the receiving terminal. If it is determined upon decoding that the number of errors in $C_{(b-1)l}(x)$ exceeds the random error-correcting capability of the code, then an indication is stored in the tracer storage unit indicating that $I_{(b-1)l}(x)$ is incorrect. Correction of $I_{(b-1)l}(x)$ is then accomplished as generally described below.

If one of the information blocks $I_{(b-2)l}(x), I_{(b-3)l}(x), \ldots, I_0(x)$ is incorrect as indicated by the tracer unit, then the following procedure is commenced. Assume, for example, that the information block $I_{(b-3)l}(x)$ is incorrect. First $M^*_{(b-1)l}(x)$ is divided by the generator polynomial $G(x)$ to obtain a remainder or syndrome. Then, portions of received and stored information blocks (except the block in error)—

$$I^1_{(b-2)l}(x)+I^3_{(b-4)l}(x)+\ldots+I_0^{b-1}(x)$$

—are subtracted from the remainder or syndrome to obtain a resultant. The resultant, which is a correct version of the originally encoded $I^2_{(b-3)l}(x)$, is then substituted for the stored version of $I^2_{(b-3)l}(x)$. The other portions of the incorrect information block $I_{(b-3)l}(x)$ are obtained in a similar fashion from already received and subsequently received information blocks.

In order to correct errors in a received block which exceed the random error-correcting capability of the code used, every $l$th one of the $(b-1)l$ previously received blocks must be correctable by the random error-correcting procedure and every $l$th one of the $(b-1)l$ subsequently received blocks must be error free. Thus, the guard space requirement for correcting bursts up to $l$ blocks in length is $(b-1)l$ blocks.

Figure 2:
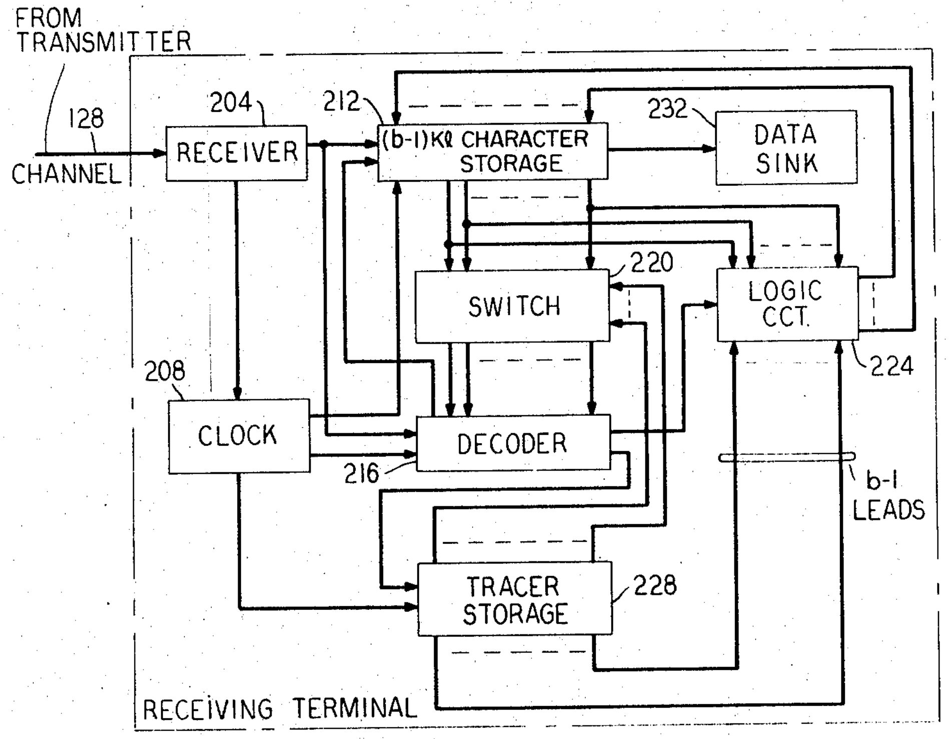

A generalized illustrative embodiment for carrying out the above described operations for the code theredescribed is shown in FIGS. 1 and 2. Blocks of information characters from an information source 104 are applied to an encoder 112 where the information blocks are encoded into an $(n, k)$ block code. The code words consist of $k$ information characters and $n$-$k$ parity check characters. The information blocks are also applied to a $kl$ character storage unit 116 which stores $l$ blocks of $k$ characters each, where $l$ is any integer. The information characters are applied by the encoder 112 via an adder 120 to a transmitter 124 which transmits the characters via a channel 128 to a receiving station. The parity characters generated by the encoder 112 are then applied to the adder 120 where they are there modified by the addition of various portions of previously transmitted information blocks which are stored in the $kl$ character storage unit 116. These portions are applied to the adder 120 at the proper time in response to a clock 108. The portions which are added were designated above as $$I^1_{(b-2)}l(x)+\ldots+I_0^{b-1}(x)$$

The resultant from this addition is then applied to the transmitter 124 where it is transmitted via the channel 128 to the receiving station.

Referring now to FIG. 2, the transmitted data is received via the channel 128 by a receiver 204 which then passes the received information blocks to a $kl$ character storage unit 212 and a decoder 216. The parity blocks or parity characters are also applied to the decoder 216. This is carried out in response to clock pulses from a clock 208. If data has previously been received, then an indication as to whether or not the information blocks of this data are correct or incorrect is stored in a tracer unit 228. If, for example, it is determined that a particular information block is incorrect (as determined by processing to hereafter be discussed) then a "1" is stored in the tracer storage unit 228 in a position associated with that information block. On the other hand, if a received block is found to be correct, then a "0" is stored in the tracer storage unit.

After receipt of a block of data and registration of the information portion in the storage unit 212 and application of the entire block to the decoder 216, the tracer storage unit 228 in response to the clock 208 signals a switch 220 whether or not every $l$th previously received information blocks is correct. If they are, then the switch 220 applies particular portions of these information blocks (as discussed earlier) from the *kl* character storage 212 to the decoder 216 where these portions are subtracted from the recently received data block. The resultant obtained from this subtraction is then decoded in the usual manner by the decoder 216. If the number of errors in the received block does not exceed the random error-correcting capability of the decoder 216, then the decoder corrects the errors and stores the corrected version of the information block in the *kl* character storage 212. If the number of errors exceeds the error-correcting capability of the decoder 216, then the decoder 216 stores a "1" in the tracer storage unit 228 indicating that the received information block in the storage unit 212 is incorrect.

If one of the group of every *l*th previously $(b-)l$ received information blocks is incorrect as indicated by the tracer storage 228, the decoder 216 generates the syndrome of the just received block of data. (This again may be done in any standard manner such as described in the aforecited Peterson text.) This syndrome is then applied by the decoder 216 to a logic circit 224. In response to an indication from the tracer storage 228 as to which block is incorrect, the logic circuit 224 substracts specific portions of every *l*th one of the $(b-1)l$ previously received information blocks stored in the storage unit 212 (except the incorrect block) from the syndrome supplied by the decoder 216 and substitutes the resultant thereof for a portion of the incorrect stored block in the *kl* character storage unit 212. The other portions of the incorrect block are generated in a like manner from previously or subsequently received blocks of data until the entire incorrect block has been replaced and corrected. The correct information blocks are then applied by the *kl* character storage unit 212 to a data sink 232.

Figure 3:
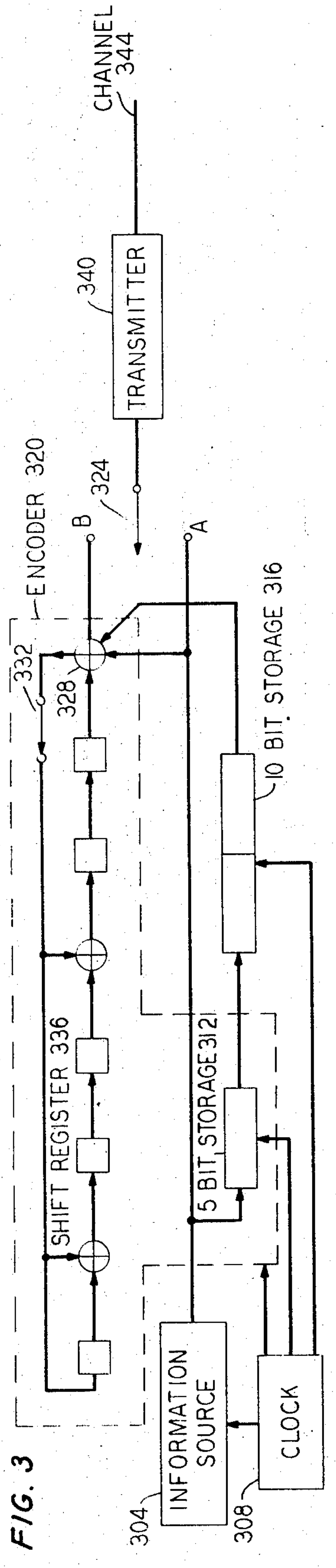
FIGS. 3 and 4 show a specific illustrative random and burst error-correcting system utilizing a (10, 5) shortened cyclic block code.
Figure 4:
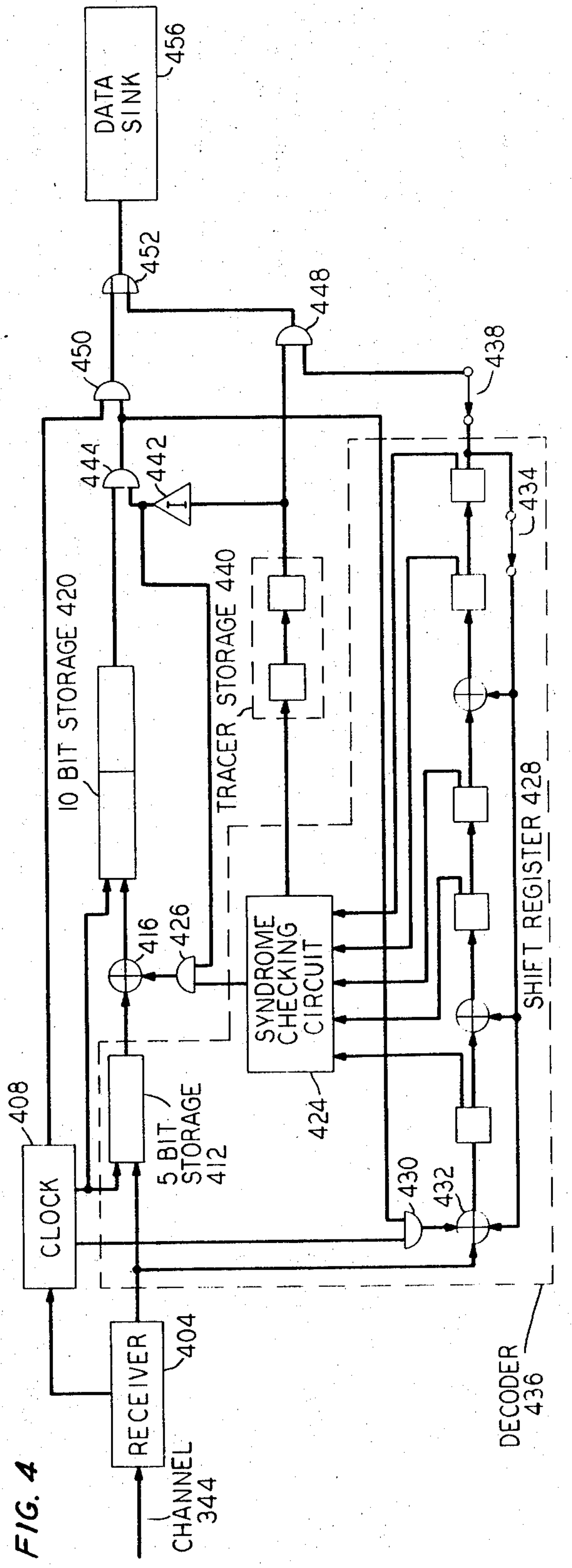

A specific illustrative embodiment of a system for utilizing the principles of the persent invention is shown in FIGS. 3 and 4. The system thereshown utilizes a binary (10, 5) shortened cyclic code with $l=2$. The generator polynomial of the code is $G(x)=x^5+x^3+x+1$. The system is capable of correcting single random errors, detecting double random errors, and correcting burst errors that occupy two 10-bit blocks provided that they are detectable and that the following two 10-bit blocks are error free. Stating the burst error-correcting capability in another way, bursts which occupy a single 10-bit block may be corrected provided that the second following 10-bit block is error free.

Referring now to FIG. 3, an information source 304 in response to a clock 308 applies 5-bit information blocks to a 5-bit storage unit 312, to a modulo-2 adder 328 and to a transmitter 340 via a switch 324 when the switch is in the A position. While an information block is being applied to the modulo-2 adder 328, a switch 332 is in the closed position thereby providing a feedback path in a shift register 336 for generation of a 5-bit parity word by the shift register 336. After a 5-bit information block has been applied to the shift register 336, the switch 332 is put in the open position, the switch 324 is put in position B, and the contents of the shift register 336 are applied to the modulo-2 adder 328. The modulo-2 adder 328 then adds the parity word from the shift register 336 to a previously transmitted information block, which is stored in the right-half of a 10-bit storage unit 316. The information block to which the parity word is added is one which was transmitted two blocks before the information block here being encoded. To illustrate this more clearly, assume that the information block now being added to the parity bits from the shift register 336 is the information block $I_0$ and that the information block following $I_0$ and now stored in the left-half of the 10-bit storage unit 316 is $I_1$ and that the information block now being encoded and stored in the 5-bit storage unit 312 is $I_2$. It is clear then that the information block $I_0$ is being added to the parity bits of the information block $I_2$. The resultant of this addition is applied via the switch 324 to the transmitter 340 for transmission over a channel 334.

Thus, each information block is added to the parity bits of each second following information block. The transmitted block consists of a 5-bit information block and a 5-bit parity block which has been modified by addition thereto of a previously transmitted information block.

It is noted here that generation of parity bits by feedback shift registers such as the shifts register 336 is discussed extensively in the aforecited Peterson text. Therefore, further elaboration about such generation is deemed unnecessary.

Each encoded and transmitted 10-bit block is received by a receiver 404 of FIG. 4. Assume now that information blocks $I_0$ and $I_1$ with their appropriate parity bits have been received by the receiver 404 and processed by the decoding station of FIG. 4. This processing which will be discussed below includes a determination as to whether or not information blocks $I_0$ and $I_1$ are correct. If it has been determined that $I_0$ is correct, then a "0" is stored in a tracer storage unit 440 in the right-hand position. If it has been determined that the information block $I_0$ is incorect, then a "1" is stored in that position. Likewise, a "0" or "1" is stored in the left-hand bit position of the tracer storage unit 440 indicating that the information block $I_1$ is correct or incorrect respectively. Now assume that the information block $I_2$ along with the appropriate parity bits for $I_2$ has been received by the receiver 404. The information block $I_2$ is then applied to a 5-bit storage unit 412 and to a modulo-2 adder 432 of a shift register 428, and then into the shift register 428. If the information block $I_0$ which is stored in the right-half of the 10-bit storage unit 420 was determined to be correct as indicated by a "0" being stored in the tracer storage unit 440, then the information block $I_0$ is transmitted via an AND gate 444 to an AND gate 430. Application of the information block $I_0$ in conjunction with the appropriate clock pulses from a clock 408 enables the AND gate 430 and causes the information block $I_0$ to be applied to the modulo-2 adder 432 where it is there added to the parity bits of the information block $I_2$ then being applied by the receiver 404 to the modulo-2 adder 432. (In the previous general discussions, the information blocks here being discussed were said to be subtracted but addition is the same as subtraction in binary operations.) The resultant of this addition is shifted into the shift register 428. While this shifting is taking place as well as while the previous shifting of the information block $I_2$ into the shift register 428 was taking place, a switch 434 is maintained in the closed position, therefore, connecting the feedback path of the shift register 428. This shifting results in the generation of a syndrome or remainder of the data block containing $I_2$. This syndrome is then applied to a syndrome checking circuit 424 where it is processed to determine how many errors have occurred in the just received block containing $I_2$. If it is determined that a single error has occurred, then an error pattern word generated by the syndrome checking circuit 424 from the syndrome is applied via an AND gate 426 to a modulo-2 adder 416 where it is added to the information block $I_2$ applied by the 5-bit storage unit 412. (The AND gate is enabled by the presence of a "0" in the right bit position of the tracer storage unit 440.) This results in any single error which exists in the information block $I_2$ being corrected and a correct information block being applied to the left-half of the ten-bit storage unit 420.

The process just described, i.e., of adding an error pattern word to the information block $I_2$ is the process for correcting any single random errors occurring in the transmitted data blocks. Such random error correction is well known in the data transmission art and is discussed in detail in the aforecited Peterson text.

If from the processing of the syndrome by the syndrome checking circuit 424 it is determined that more than a single error has occurred in the received data block, then the syndrome checking circuit 424 registers a "1"

in the left bit position of the tracer storage unit 440 and shifts the bit already in that position to the right bit position. The information block $I_2$ is then applied via the modulo-2 adder 416 to the 10-bit storage unit 420 and the information block $I_0$ is applied via the AND gate 444, an AND gate 450 and an OR gate 452 to a data sink 456.

Now assume that the information block $I_0$ was determined to be incorrect (rather than correct as above) and is so indicated by the storage of a "1" in the right bit position of the tracer storage unit 440. In this case the parity bits of the information block $I_2$ after they are received by the receiver 404 are applied via the modulo-2 adder 432 to the shift register 428 and to the 5-bit storage unit 412. Shifting of these parity bits into the shift register 428 when the switch 434 is in the closed position (and the switch 438 is in the open position) results in the generation of the syndrome of the data block containing $I_2$. It will be remembered that in the encoding of the information block $I_2$ that the information block $I_0$ was added to the parity bits of the information block $I_2$ before transmission. Thus, generation of the syndrome of the received data block containing $I_2$ results in the generation of the information block $I_0$ (providing, of course, that no errors have occurred in the data block containing $I_2$). That is, when $I_2+R[(x^5I_2)/G(x)]+I_0$ is divided by the generator polynomial $G(x)$, the remainder or syndrome is $I_0$. The contents of the shift register 428, which is the information block $I_0$, is then applied via the switch 438 which is now closed to an AND gate 448. The AND gate 448 is enabled by the presence of a "1" in the right bit position of the tracer storage unit 440 thereby transferring $I_0$ to the OR gate 452 and to the data sink 456. In this manner, the information block $I_0$ which previously was determined to be incorrect is corrected utilizing the subsequently transmitted data block containing $I_2$.

An example will now be given of the operation of the system of FIGS. 3 and 4. Assume that the information block $I_0$, $I_1$, $I_2$ and $I_3$ shown in FIG. 5 are to be transmitted. The information source 304 first applies the information block $I_0$ consisting of the bits 00001 to the shift register 336. The bit "1" is first applied to the shift register 336 resulting in the generation of the word 11010 in the shift register. Application of the next bit of the information block $I_0$, i.e., a "0," results in the generation of the word 01101. Likewise, application of the remaining "0's" to the shift register 336 results in the generation of the partiy bits 00111 just as is indicated in FIG. 5. These parity bits are then added to the right half of the contents of the 10-bit storage unit 316 which at this time contains all "0's" since no information blocks have previously been transmitted. The resultant $M_0$ (FIG. 5) is then applied to the transmitter 340 for transmission over the channel 344. The other information blocks $I_1$, $I_2$ and $I_3$ are encoded in a like manner. The various stages of the encoding process for each of the information blocks is shown in FIG. 5. That is, the parity bits P for each information block are illustrated as are the code blocks C consisting of the information blocks and the parity bits. The transmitted data blocks M consisting of the code blocks plus the previously transmitted information blocks are likewise shown.

Now assume that the transmitted data blocks $M_0$ through $M_3$ are received by the receiver 404 of FIG. 4 with the errors shown in FIG. 6. For example, the data block $M_0$ is received with seven errors, the data block $M_1$ with one error, etc. The asterisk by the designations $M_0$, $M_1$, etc. is used to distinguish the received blocks which may contain errors from the transmitted blocks:

After receipt of the block $M_0$* by the receiver 404, the receiver applies the first five received bits, i.e., the information block $I_0$, to the five bit storage unit 412 and the shift register 428. The receiver 404 then applies the remaining five bits of the received data block $M_0$*, i.e., the parity bits, to the modulo-2 adder 432 and shift register 428. Since no data blocks had previously been received, the tracer storage unit 440 is storing "0's" and thus the contents of the right-half of the 10-bit storage unit 420 is added by the modulo-2 adder 432 to the parity bits of the received data block $M_0$*. Since the contents are "0's," the parity bits are not affected. Shifting the received data block $M_0$* into the shift register 428 with the switch 432 closed causes the generation of the syndrome 01011. Since this syndrome is not found among the syndromes which indicate correctable errors (FIG. 7), the syndrome checking circuit 424 determines that the errors cannot be corrected and that the information block $I_0$ is incorrect. The syndrome checking circuit then stores "1" in the left bit position of the tracer storage unit 440 to thus indicate that the information block $I_0$ is incorrect. The informaion block $I_0$ is then applied by the 5-bit storage unit 412 to the left-half of the 10-bit storage unit 420.

The data block $M_1$* is next received and the information block $I_1$ applied to the 5-bit storage 412 and the shift register 428. The parity bits of the received data block $M_1$* are then applied to the modulo-2 adder 432. Since the right bit position of the tracer storage unit 440 stores a "0," the contents of the right-half of the 10-bit storage unit 420 are added to the parity bits of the data block $M_1$* before applying these bits to the shift register 428. Again, however, the parity bits are not affected since all "0's" were stored in the right-half of the unit 420. Application of the parity bits of $M_1$* to the shift register 428 with switch 434 closed, as before, causes generation of the syndrome of the data block $M_1$*. The syndrome generated is 00111 which is then applied to the syndrome checking circuit 424 where it is processed to determine if this syndrome is one which indicates a correctable error. Examination of the syndromes shown in FIG. 7 indicate that a correctable error has occurred and that the position of this error is position one. That this is, in fact, the case is apparent from an examination of FIG. 6 and the received data block $M_1$* where it is there shown that the bit in position one is in error. The error pattern word 00001 is then generated by the syndrome checking circuit 424 and applied to the modulo-2 adder 416 where it is added to the information block $I_1$ as it is applied by the 5-bit storage unit 412. The resultant is shifted into the 10-bit storage unit 420 and the information block $I_0$ which was in the left-half of the 10-bit storage unit 420 is shifted into the right-half. The syndrome checking circuit 424 also applies a "0" to the tracer storage unit 440 causing the "1" which was in the left bit position of the tracer storage unit to be shifted to the right bit position thereof. The status of the decoder station at this time is that the information block $I_0$ is stored in the right half of the 10-bit storage unit 420, the information block $I_1$ is stored in the left half, a "1" is stored in the right bit position of the tracer storage unit 440 and a "0" is stored in the left half.

The data block $M_2$* is next received by the receiver 404 and the information block $I_2$ applies to the 5-bit storage 412 and to the shift register 428. The parity bits of the received data block $M_2$* are next applied to the modulo-2 adder 432. Since a "1" is stored in the right bit position of the tracer storage unit 440 the contents of the right-half of the 10-bit storage unit 420 are not applied simultaneously with the application of the parity bits to the modulo-2 adder 432. Rather, the parity bits $M_2$* are shifted into the shift register 428 and the syndrome of $M_2$* is generated. The syndrome generated is 00001 which is the same as the correct version of the information block $I_0$ (refer to FIG. 5). After the generation of this syndrome, switch 434 is opened, switch 438 is closed, and the syndrome applied via AND gate 448 and OR gate 452 to the data sink in place of the incorrect information block $I_0$ which is stored in the right-half of the 10-bit storage unit 420. The stored information block $I_0$ is merely shifted from the unit 420 and discarded. In this manner, the burst errors which occurred in the information block $I_0$ are corrected.

The data block $M_3^*$ is lastly received by the receiver 404 and applied to the decoder 436 where it is processed as described above. In this case, the information block $I_1$ which is now in the right-half of the 10-bit storage unit 420 is added to the parity bits of the $M_3^*$ and the resultant applied to the shift register 428. Applying this resultant to the shift register 428 with the switch 434 closed causes generation of the syndrome 11010. Referring to FIG. 7, this syndrome indicates that a single error has occurred in the fifth position of the received information block $I_3$. Reference to FIG. 6 indicates that an error did occur in the fifth bit position. This error is corrected in the information block $I_3$ as discussed earlier and applied to the 10-bit storage unit 420.

In the manner described above for the illustrative system of FIGS. 3 and 4, single random errors can be corrected as can burst errors which occupy two 10-bit data blocks provided the following two 10-bit data blocks are error free. This correction is accomplished with a minimal storage requirement at the decoder station. In fact, the storage requirement is less than the required guard space of the system. The storage requirement is fifteen bits while the guard space requirement is twenty bits.

It is noted that detailed circuit configurations for units 308 and 340 of FIG. 3 and units 404, 408 and 424 of FIG. 4 have not been given because their arrangements are considered to be clearly within the skill of the art. It is also noted that switch 324 of FIG. 3 and switches 434 and 438 of FIG. 4 would be actuated by clocks or other control logic even though such is not shown in the drawings. The switches were shown as simple two-position switches to simplify the explanation of the present invention.

Finally, it is understood that the above described arrangements are only illustrative of the application of the principles of the present invention. Numerous other modifications and alternative arrangements may be devised by those skilled in the art without departing from the spirit and scope of the invention. Any random error-correcting block code which meets the requirements set forth above can be employed and conventional random error-correcting methods used.

What is claimed is:

1. In combination in a data transmission system comprising a source of information blocks, encoding means responsive to said information source for encoding said information blocks in an $(n, k)$ block code having an $r$ random error-correcting capability where $k/n \leqq (b-1)/b$ and $b$ is an integer, means for storing $(b-1)l$ of the most recently encoded information blocks where $l$ is any integer, means for adding data derived from portions of every $l$th stored information block to the code blocks, and means for applying the resultant of said addition to one end of a communication channel.

2. A combination as in claim 1 further comprising means connected to the other end of said channel for receiving said applied blocks, means for storing $(b-1)l$ of the most recently received information portions of the received blocks, means for correcting $r$ or less random errors and detecting greater than $r$ errors in said received blocks, and means responsive to said correcting and detecting means for replacing the information portion of those received blocks in which greater than $r$ errors are detected with other error-free information portions.

3. A combination as in claim 2 wherein said correcting and detecting means comprises means for storing an indication of those of the $(b-1)l$ most recently received blocks which contain greater than $r$ errors and of those which contain $r$ or less errors, means for subtracting from the most recently received block data derived from portions of every $l$th one of the $(b-1)l$ most recently received information portions when said indicating storing means indicates that every $l$th one of the most recently received blocks contains $r$ or less errors, means for correcting $r$ or less random errors in the resultant of said subtraction, and means for detecting greater than $r$ errors in the resultant of said subtraction and for storing an indication in said indication storing means that greater than $r$ errors have been detected.

4. A combination as in claim 3 wherein said replacing means comprises means responsive to an indication in said indication storing means that one of the group of every $l$th one of the $(b-1)l$ most recently received blocks contains greater than $r$ errors for decoding the most recently received block to obtain the syndrome thereof, means for subtracting from said syndrome data derived from portions of every $l$th one of the $(b-1)l$ most recently received information portions except that portion of the received block which is indicated as containing greater than $r$ errors, and means for replacing a portion of the information portion of the block containing greater than $r$ errors with data derived from the resultant obtained from subtracting said portions from said syndrome.

5. A data transmission system comprising a source of information blocks I, encoding means responsive to said information source for encoding said information blocks into code words C, said code words belonging to an $(n, k)$ block code having an $r$ random error correcting capability where $k/n=(b-1)/b$ and $b$ is an integer, means for storing $(b-1)l$ of the most recently encoded information blocks $I_0 \ldots I_{(b-2)l}$ where $l$ is any integer, means for adding $I^1{}_{(b-2)l}+I^2{}_{(b-3)l}+\ldots+I_0{}^{b-1}$ to the most recently encoded word $C_{(b-1)l}$ to obtain $M_{(b-1)l}$, where $I_j{}^i$=$i$th group of $k/(b-1)$ characters of the $j$th information block $I_j$, and means connected to one end of a communication channel for transmitting the blocks M obtained from said addition.

6. A system as in claim 5 further comprising means connected to the other end of said channel for receiving the transmitted block M* which may include errors, means connected to said receiving means for storing $(b-1)l$ of the most recently received information blocks $I_0, \ldots, I_{(b-2)l}$ obtained from received blocks $M_0^*, \ldots, M^*_{(b-2)l}$ respectively, means for correcting $r$ or less random errors in said received blocks and for detecting greater than $r$ errors, and means responsive to said correcting and detecting means for replacing the information blocks of received blocks in which greater than $r$ errors are detected with portions of other error-free information blocks.

7. The system of claim 6 wherein said correcting and detecting means comprises means for storing an indication of those of the $(b-1)l$ most recently received blocks $M_0^*, \ldots, M^*_{(b-2)l}$ in which greater than $r$ errors are detected and of those in which $r$ or less errors are detected, means responsive to indications in said indication storing means that $r$ or less errors were detected in blocks $M_0^*, M_1^*, \ldots, M^*_{(b-2)l}$ for subtracting $$I^1{}_{(b-2)l}+I^2{}_{(b-3)l}+\ldots+I_0{}^{b-1}$$

from $M^*_{(b-1)l}$, and means for generating the syndrome of the resultant of said subtraction.

8. A system as in claim 7 wherein said correcting and detecting means further comprises means for correcting the errors in the information block $I_{(b-1)l}$ of $M^*_{(b-1)l}$ when said syndrome indicates that $M^*_{(b-1)l}$ contains $r$ or less errors and means for storing an indication in said indication storing means that $M^*_{(b-1)l}$ contains greater $r$ errors when said syndrome indicates that greater than $r$ errors have occurred in $M^*_{(b-1)l}$.

9. A system as in claim 8 wherein said replacing means comprises means responsive to an indication in said indication storing means that greater than $r$ errors have occurred in the block $M_{2l}^*$ of the received blocks $M_0^*, M_1^*,$ . . . , $M^*_{(b-2)l}$ for generating the syndrome of $M^*_{(b-1)l}$, where $z=0, 1, \ldots,$ or $(b-2)$, means for subtracting $$I^1_{(b-2)l}+\ldots+I^{b-z-2}_{(z+1)l}+I^{b-z}_{(z-1)l}+\ldots+I^{b-1}_0$$

from the syndrome of $M^*_{(b-1)l}$, and means for substituting the resultant obtained therefrom for $$I^{b-z-1}_{zl}$$

stored in the information block storing means to thereby correct errors in $$I^{b-z-1}_{zl}$$

10. A system as in claim 9 further comprising means for applying the corrected information blocks to a data utilization circuit.

11. A data transmission system comprising a source of information blocks, encoding means responsive to said information source for encoding said information blocks in an $(n, k)$ block code having an $r$ random error-correcting capability where $k/n=1/2$, means for storing $l$ of the most recently encoded information blocks where $l$ is any integer, means for adding the first stored information block $I_0$ of the $l$ most recently encoded information blocks to the parity characters of the most recently encoded information block $I_l$ to obtain block $M_l$, and means connected to one end of a communication channel for transmitting $M_l$.

12. A system as in claim 11 further comprising means connected to the other end of said channel for receiving $M_l^*$ representing $M_l$ plus any errors which may have occurred in the transmission, means for storing the information blocks and the $l$ most recently received blocks $M_0^*, \ldots, M_{l-1}^*$, means for correcting $r$ or less random errors and for detecting greater than $r$ errors in the most recently received block $M_l^*$, and means responsive to said correcting and detecting means for replacing an information block in which greater than $r$ errors are detected with a portion of the $l$th subsequently received block.

13. A system of claim 12 wherein said correcting and detecting means comprises means for storing an indication of those of the $l$th most recently received blocks in which greater than $r$ errors were detected and of those in which $r$ or less errors were detected, means for subtracting the first received information block $I_0$ of these stored in the information block storing means from the most recently received block $M_l^*$ to obtain $C_l$ when the indication storing means indicates that $r$ or less errors were detected in the block $M_0^*$, means for generating the syndrome of $C_l$, means responsive to said syndrome for correcting $r$ or less errors in $M_l^*$ and for storing $I_l$ of the corrected $M_l^*$ in the information block storing means and means responsive to said syndrome for detecting greater than $r$ errors in the block $M_l^*$ and for storing an indication thereof in said indication storing means.

14. A system as in claim 13 wherein said replacing means comprises means responsive to said indication storing means indicating that block $M_0^*$ contained greater than $r$ errors for decoding $M_l^*$ to obtain the syndrome thereof, and means for substituting the syndrome of $M_l^*$ for $I_0$ stored in the information block storing means.

15. A system as in claim 14 further comprising means for applying the information blocks stored in said information block storing means to a data utilization circuit.

16. A method of correcting random and burst errors which occur on a data communication channel comprising the steps of encoding information sequences I into code words C of a $(n, k)$ block code having $r$ random error-correcting capability where $k/n=(b-1)/b$ and $b$ is an integer, storing the $(b-1)l$ previously encoded information sequences $I_0, I_1, \ldots, I_{(b-1)l}$, where $l$ is any integer, adding data derived from portions $$I^1_{(b-2)l}+I^2_{(b-3)l}+\ldots+I_0^{b-1}$$

of said stored information sequences to the most recently encoded word $C_{(b-1)l}$ where $I_j^i$ represents the $i$th group of $k/(b-1)$ bits of the $j$th information sequence $I_j$ and $j=0, 1, \ldots,$ transmitting the resultant sequences M of said addition over a data communication channel, receiving said transmitted sequences $M^*$ which may include errors, storing $(b-1)l$ of the most recently received information sequences $I_0, \ldots, I_{(b-2)l}$ obtained from the received sequences $M_0^*, \ldots, M^*_{(b-2)l}$ respectively, subtracting data derived from $$I^1_{(b-2)l}+I^2_{(b-3)l}+\ldots+I_0^{b-1}$$

from the most recently received sequence $M^*_{(b-1)l}$ to obtain $C_{(b-1)l}$ when $I_0, \ldots, I_{(b-3)l}, I_{(b-2)l}$ are indicated as being correct by a tracer storage unit, decoding $C_{(b-1)l}$, correcting errors included in $M^*_{(b-1)l}$ when it is determined by said decoding that $r$ or less errors have occurred, and storing an indication in said tracer storage unit that the just received information sequence $I_{(b-1)l}$ is incorrect when it is determined from said decoding that greater than $r$ errors have occurred in the received information sequence $M^*_{(b-1)l}$.

17. A method as in claim 16 further comprising the steps of decoding the received sequence $M^*_{(b-1)}$ to obtain the syndrome thereof when said tracer storage unit indicates that the information sequence $I_{zl}$ of the information sequences $I_0, I_l, \ldots, I_{(b-2)l}$ is incorrect, where $z=0, 1, \ldots,$ or $b-2$, subtracting data derived from $$I^1_{(b-2)l}+\ldots+I^{b-z-2}_{(z+1)l}+I^{b-z}_{(z-1)l}+\ldots+I^{b-1}_0$$

from said syndrome, and substituting data derived from the resultant obtained from said subtraction for $$I^{b-z-1}_{zl}$$

stored in the information sequence storing unit.

18. The method of claim 17 further comprising the steps applying the information sequences stored in said information sequence storing unit to a data utilization circuit.

References Cited

UNITED STATES PATENTS 3,452,328 6/1969 Hsiao et al. ........ 340—146.1

MALCOLM A. MORRISON, Primary Examiner

R. S. DILDINE, Jr., Assistant Examiner